(12) United States Patent
Yoshida et al.

(10) Patent No.: US 9,511,813 B2
(45) Date of Patent: Dec. 6, 2016

(54) VEHICLE BODY FRAME STRUCTURE OF MOTORCYCLE

(71) Applicant: SUZUKI MOTOR CORPORATION, Hamamatsu-shi, Shizuoka (JP)

(72) Inventors: Takeshi Yoshida, Hamamatsu (JP); Naoto Hori, Hamamatsu (JP)

(73) Assignee: SUZUKI MOTOR CORPORATION, Hamamatsu-Shi, Shizuoka (JP)

(*) Notice: Subject to any disclaimer, the term of this patent is extended or adjusted under 35 U.S.C. 154(b) by 0 days.

(21) Appl. No.: 14/733,025

(22) Filed: Jun. 8, 2015

(65) Prior Publication Data

US 2015/0367904 A1    Dec. 24, 2015

(30) Foreign Application Priority Data

Jun. 24, 2014 (JP) .................... 2014-129370

(51) Int. Cl.
*B62K 11/02* (2006.01)
*B62J 25/00* (2006.01)
(Continued)

(52) U.S. Cl.
CPC ............... *B62K 11/02* (2013.01); *B62J 25/00* (2013.01); *B62K 19/06* (2013.01); *B62K 19/08* (2013.01);
(Continued)

(58) Field of Classification Search
CPC ...................................... B62K 11/04
See application file for complete search history.

(56) References Cited

U.S. PATENT DOCUMENTS 5,375,677 A     12/1994  Yamagiwa et al.
2007/0193805 A1*  8/2007  Adachi ............... B62K 11/04
                                                180/219

FOREIGN PATENT DOCUMENTS

EP       1403177 A2    3/2004
JP       H06321153 A   11/1994
(Continued)

OTHER PUBLICATIONS

Japanese Office Action mailed Jan. 5, 2016 issued in corresponding Japanese Patent Applicaiton No. 2014-129370.
(Continued)

*Primary Examiner* — Kevin Hurley
(74) *Attorney, Agent, or Firm* — Troutman Sanders LLP (57) ABSTRACT

There are provided: a front frame extending rearward and downward from a head pipe while enlarging a width thereof; and a body frame joined to rear ends of the front frame and supporting a swing arm. The body frame is formed in a manner that right and left body parts joined to the rear ends of the front frame, and bridge parts for upper portions and lower ends of the right and left body parts are integrally molded. Solid structures are provided in the middle of the right and left body parts, a continuous hollow structure formed of the upper portions of the right and left body parts and the upper bridge part and a continuous hollow structure formed of lower portions of the right and left body parts and the lower bridge part are provided at an upper position and a lower position, respectively, with the solid structures sandwiched therebetween. Further, pivot parts being pivot support parts for the swing arm are provided to the solid structures of the body parts.

2 Claims, 11 Drawing Sheets

(51) Int. Cl.
*B62K 19/06* (2006.01)
*B62K 19/08* (2006.01)
*B62K 19/24* (2006.01)
B62K 25/04 (2006.01)
B62K 19/32 (2006.01)

(52) U.S. Cl.
CPC ............... *B62K 19/24* (2013.01); *B62K 19/32* (2013.01); *B62K 25/04* (2013.01)

(56) References Cited

FOREIGN PATENT DOCUMENTS

| JP | H107060 A | 1/1998 |
| JP | 2004114719 A | 4/2004 |
| JP | 2006143055 A | 6/2006 |

OTHER PUBLICATIONS

German Office Action dated May 18, 2016 issued in corresponding German Patent Application No. 102015110083.5.

\* cited by examiner

VEHICLE BODY FRAME STRUCTURE OF MOTORCYCLE

CROSS-REFERENCE TO RELATED APPLICATION

This application is based upon and claims the benefit of priority of the prior Japanese Patent Application No. 2014-129370, filed on Jun. 24, 2014, the entire contents of which are incorporated herein by reference.

BACKGROUND OF THE INVENTION

Field of the Invention

The present invention relates to a vehicle body frame structure of a motorcycle.

Description of the Related Art

As a vehicle body frame structure of a motorcycle, for example, Patent Document 1 discloses one provided with a front frame formed of a head pipe and a pair of right and left tank rails, and a rear frame formed of rear-arm brackets and upper and lower cross members. The rear frame is formed in a manner that the pair of right and left rear-arm brackets, the upper cross member connecting mutual upper end portions of these rear-arm brackets, and the lower cross member connecting mutual lower end portions of the rear-arm brackets are integrally formed. The rear-arm brackets are formed to exhibit a quadrangular shape in a cross section having a hollow portion, with the use of an outer plate on the outside of the vehicle body, an inner plate on the inside of the vehicle body, a front wall and a rear wall connecting these both side plates, and the like. Further, at a center part in an up-and-down direction of the rear-arm brackets, there are formed shaft holes each for pivotally supporting a rear arm supporting pivot shaft, by thickening the front wall.

[Patent Document 1] Japanese Laid-open Patent Publication No. 2004-114719

However, in the vehicle body frame structure of the motorcycle disclosed in Patent Document 1, the pivot shaft is provided so as to be adjacent to the hollow portion of the rear-arm bracket (refer to FIG. 14 in Patent Document 1). Although it is ideal that a periphery of the pivot shaft has a high rigidity for a driving stability, if the pivot shaft is provided so as to be adjacent to the hollow portion, it is difficult to provide a high rigidity to the periphery of the pivot shaft.

SUMMARY OF THE INVENTION

The present invention is made in view of the points as described above, and an object thereof is to realize a reduction in weight by making a body frame have a hollow structure, and to enable a periphery of each pivot support part for a swing arm to have a high rigidity.

A vehicle body frame structure of a motorcycle of the present invention is characterized in that it includes: a front frame extending rearward and downward from a head pipe while enlarging a width thereof; and a body frame joined to rear ends of the front frame and supporting a swing arm, in which the body frame is formed in a manner that right and left body parts joined to the rear ends of the front frame, an upper bridge part connecting between upper portions of the right and left body parts, and a lower bridge part connecting between lower ends of the right and left body parts are integrally molded, solid structures are provided in the middle of the right and left body parts, and a continuous hollow structure formed of the upper portions of the right and left body parts and the upper bridge part and a continuous hollow structure formed of lower portions of the right and left body parts and the lower bridge part are provided at an upper position and a lower position, respectively, with the solid structures sandwiched therebetween, and pivot support parts for the swing arm are provided to the solid structures.

Further, another characteristic of the vehicle body frame structure of the motorcycle of the present invention lies in a point that a footrest is attached to the solid structure.

Further, still another characteristic of the vehicle body frame structure of the motorcycle of the present invention lies in a point that the body frame is configured as a die-cast or cast product, the hollow structure of the upper portions of the right and left body parts and the upper bridge part is molded by a core, and the hollow structure of the lower portions of the right and left body parts and the lower bridge part is molded by a core which is different from the core.

DETAILED DESCRIPTION OF THE PREFERRED EMBODIMENTS

Hereinafter, a preferred embodiment of the present invention will be described while referring to the attached drawings. In the present application, it is set that directions of front, rear, right and left indicate directions based on a motorcycle, and in the respective drawings, a front side and a rear side of a vehicle are represented by an arrow mark Fr and an arrow mark Rr, respectively, according to need.

Figure 1:
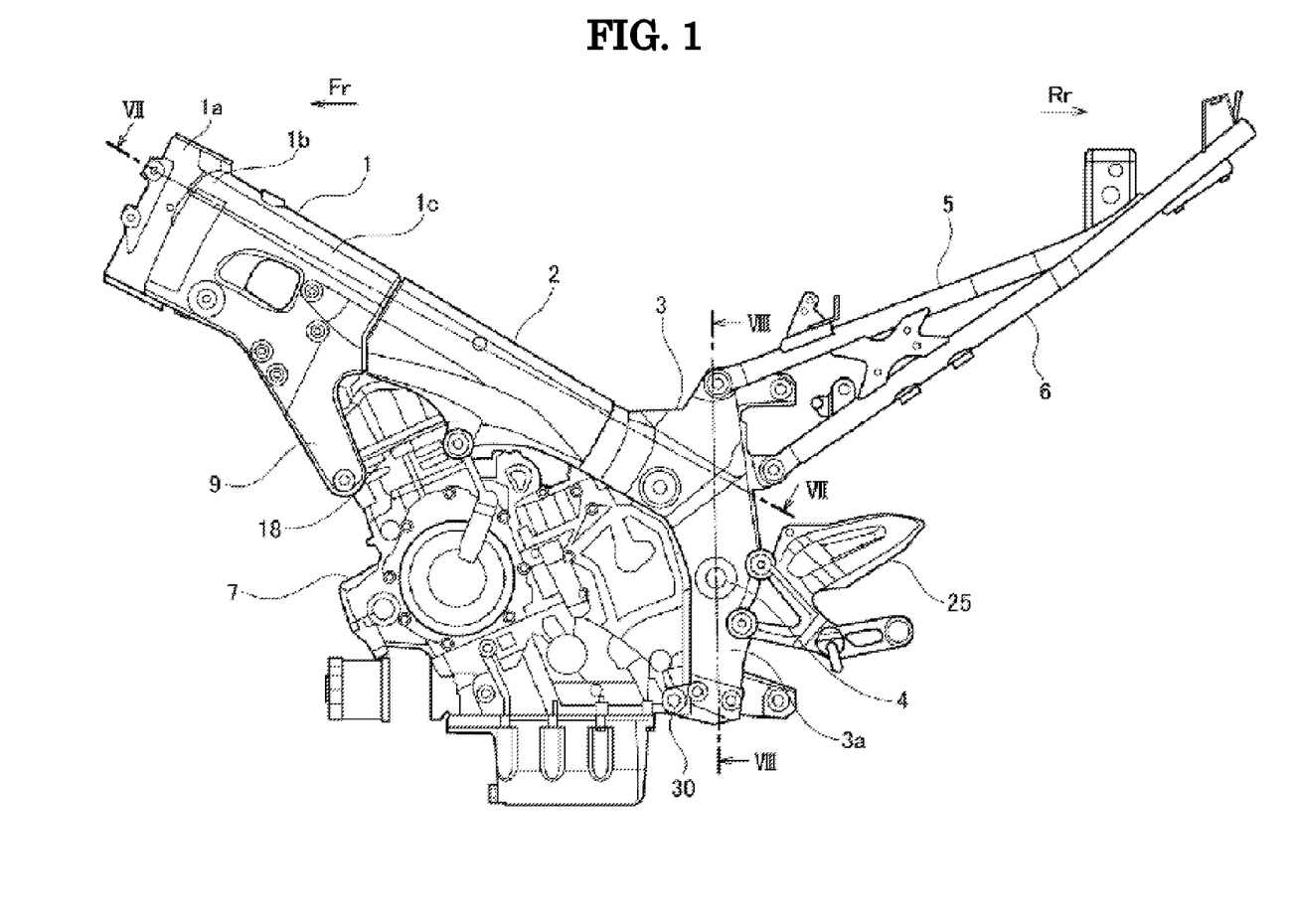
FIG. 1 is a side view illustrating a part of a motorcycle including a vehicle body frame structure according to an embodiment.
Figure 2:
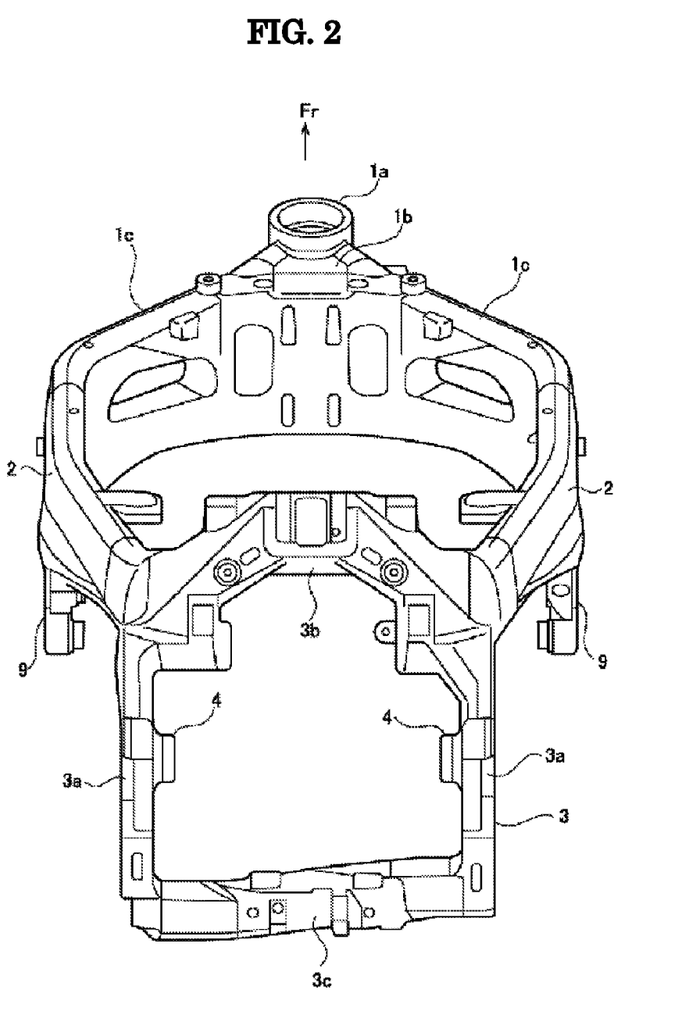
FIG. 2 is a perspective view, when seen from a rear side, of the vehicle body frame structure according to the embodiment.

As illustrated in FIG. 1 and FIG. 2, there is provided a head frame 1 including a head pipe 1a for supporting a not-illustrated front fork, and having right and left frame parts 1c extending rearward and downward while enlarging a width thereof at a rear side of the head pipe 1a.

Further, there are provided right and left tank rails 2 joined to rear ends of the frame parts 1c of the head frame 1 and extending rearward and downward.

Further, there is provided a body frame 3 joined to rear ends of the right and left tank rails 2. To the body frame 3, pivot parts 4 being pivot support parts for a not-illustrated rear swing arm are provided. Further, to a rear part of the body frame 3, a pair of right and left seat rails 5 and a backstay 6 extending diagonally upward toward the rear side are coupled.

By the vehicle body frame configured as above, an engine unit 7 is suspended. The vehicle body frame structure of the motorcycle according to the present embodiment employs a diamond frame structure in which a frame member surrounding a lower part of the engine unit 7 is omitted, and the engine unit 7 itself is used as a strength member.

Hereinafter, respective structures of the head frame 1, the tank rails 2 and the body frame 3 configuring the vehicle body frame, will be described in detail while referring to FIG. 3 to FIG. 11 as well.

The head frame 1 is formed in a manner that the head pipe 1a, a coupling part 1b provided at a rear part of the head pipe 1a, and the right and left frame parts 1c bifurcated from the coupling part 1b and extending rearward and downward while enlarging a width thereof, are integrally molded.

Figure 3:
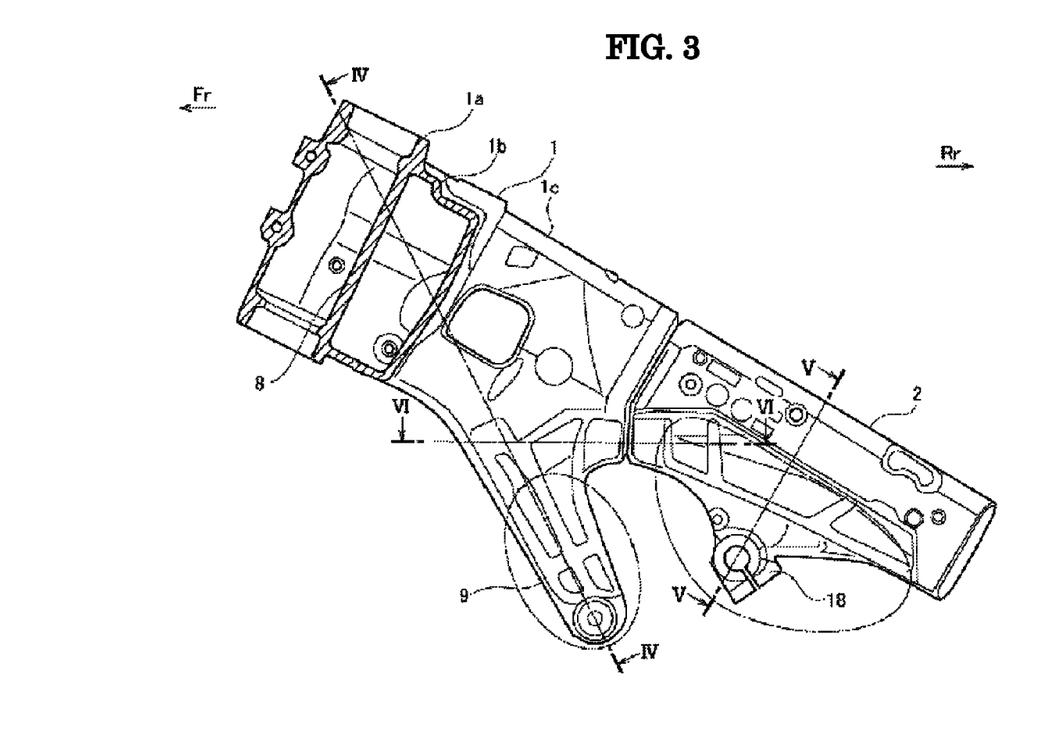
FIG. 3 is a side view illustrating a head frame and a tank rail of the vehicle body frame structure according to the embodiment.

Here, the head frame 1 has a hollow closed cross-sectional structure from a rear end of one frame part 1c to a rear end of the other frame part 1c via the coupling part 1b. Note that a wall part 8 partitions between the head pipe 1a and the coupling part 1b, as illustrated in FIG. 3.

Figure 4:
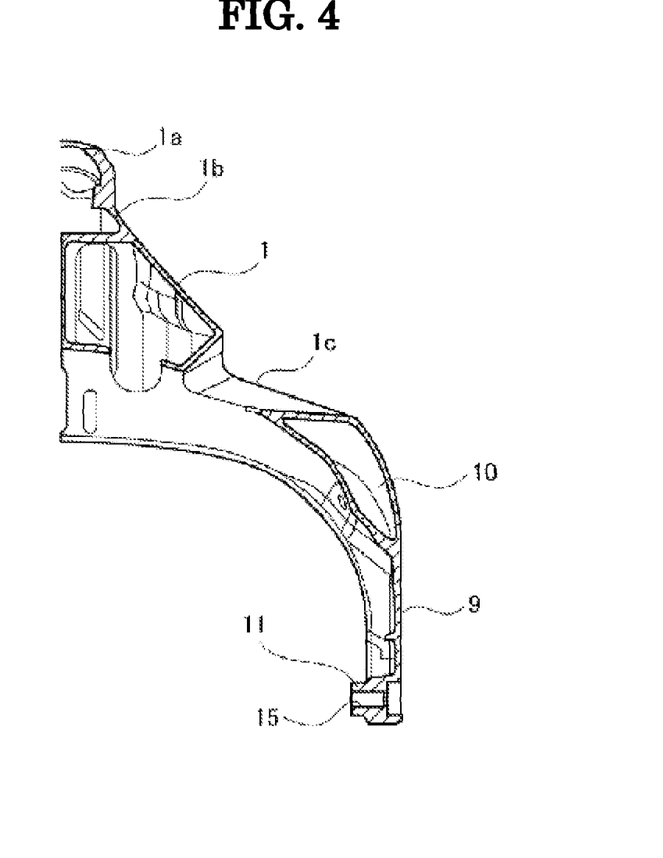
FIG. 4 is a sectional view taken along line IV-IV in FIG. 3.
Figure 6:
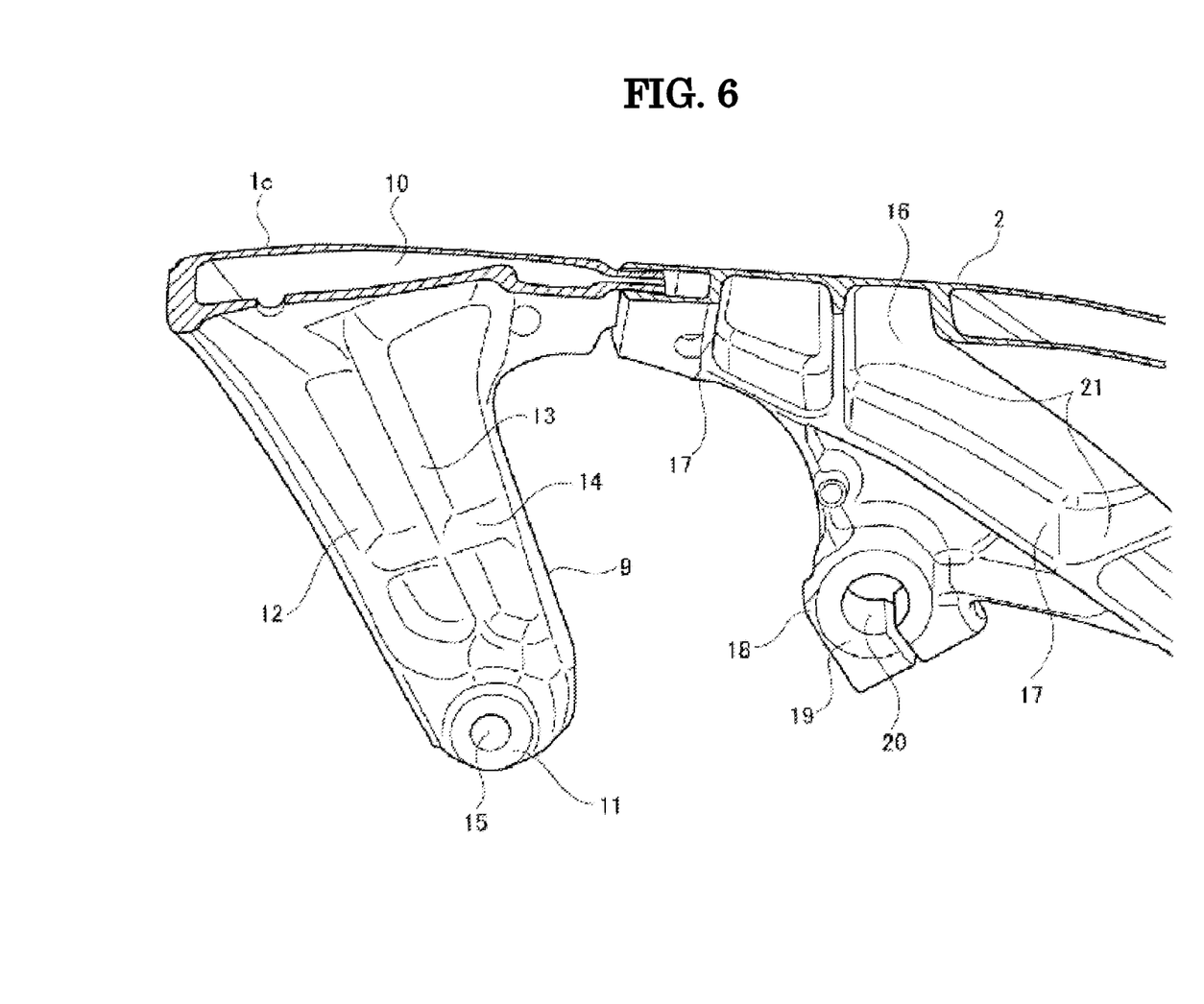
FIG. 6 is a sectional view taken along line VI-VI in FIG. 3.

Further, an engine bracket part 9 having an open cross-sectional structure is integrally molded at a lower part of the frame part 1c, which is at a position close to the tank rail 2. As illustrated in FIG. 4 and FIG. 6, at a part of the lower part of the frame part 1c, a width of a hollow portion 10 becomes gradually narrow, and the portion continues to the engine bracket part 9 with a plate shape. The engine bracket part 9 extends rearward and downward, and has an engine suspension boss 11 formed on a tip thereof. Note that in FIG. 3, a part of the open cross-sectional structure is indicated by being surrounded by a circle.

In the engine bracket part 9, a reinforcing rib 12 is integrally molded with a peripheral edge of the part, and reinforcing ribs 13 and 14 extending in a longitudinal direction and in a width direction are integrally molded. The reinforcing rib 13 in the longitudinal direction extends toward a bolt hole 15 formed on the engine suspension boss 11.

As described above, each of the frame parts 1c of the head frame 1 has the closed cross-sectional structure, and it also has the open cross-sectional structure in a part in the longitudinal direction thereof. Accordingly, it is possible to realize a reduction in weight of the head frame 1. Further, the open cross-sectional structure is used as the engine suspension part, and is fixed to the engine unit 7, so that even if the open cross-sectional structure is used, the strength and the rigidity are secured.

The head frame 1 designed as above is configured as an aluminum die-cast or aluminum cast product.

The right and left tank rails 2 are joined to the rear ends of the frame parts 1c of the head frame 1, and extended rearward and downward.

Here, each of the tank rails 2 has a hollow closed cross-sectional structure from a front end to a rear end.

Figure 5:
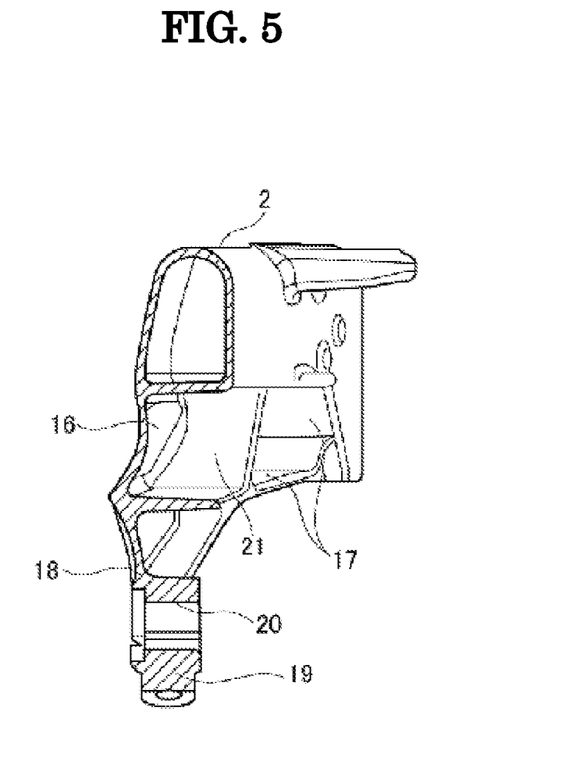
FIG. 5 is a sectional view taken along line V-V in FIG. 3.

Further, a lower part of the tank rail 2 has an open cross-sectional structure, in a region excluding the front and rear ends of the tank rail 2. As illustrated in FIG. 5 and FIG. 6, the tank rail 2 has the open cross-sectional structure which opens toward the inside in a vehicle width direction, having a surface 16 on the outside in the vehicle width direction of the tank rail 2 set as a bottom, and a peripheral wall 17 provided to rise toward the inside in the vehicle width direction. Further, an engine bracket part 18 having an open cross-sectional structure is integrally molded with the open cross-sectional structure of the tank rail 2. The engine bracket part 18 extends forward and downward, and has an engine suspension boss 19 formed thereon. Specifically, the lower part of the tank rail 2 itself has the open cross-sectional structure in the region excluding the front and rear ends of the tank rail 2, so that the tank rail 2 has both of the closed cross-sectional structure and the open cross-sectional structure in a transverse section (a cross section perpendicular to the longitudinal direction). Note that in FIG. 3, a part of the open cross-sectional structure is indicated by being surrounded by a circle.

A pair of reinforcing ribs 21 extending toward a bolt hole 20 formed on the engine suspension boss 19 are integrally molded on the inside of the surface 16 of the tank rail 2.

As described above, each of the tank rails 2 has the closed cross-sectional structure, and it also has the open cross-sectional structure in a part in the longitudinal direction thereof. Accordingly, it is possible to realize the reduction in weight of the head frame 1. Further, the open cross-sectional structure is used as the engine suspension part, and is fixed to the engine unit 7, so that even if the open cross-sectional structure is used, the strength and the rigidity are secured. Further, since the lower part of the tank rail 2 itself has the open cross-sectional structure, it becomes possible to realize the reduction in weight while enlarging the frame in a side view for suppressing an exposure of built-in components.

Each of the tank rails 2 designed as above is configured as an aluminum die-cast or aluminum cast product.

Figure 7:
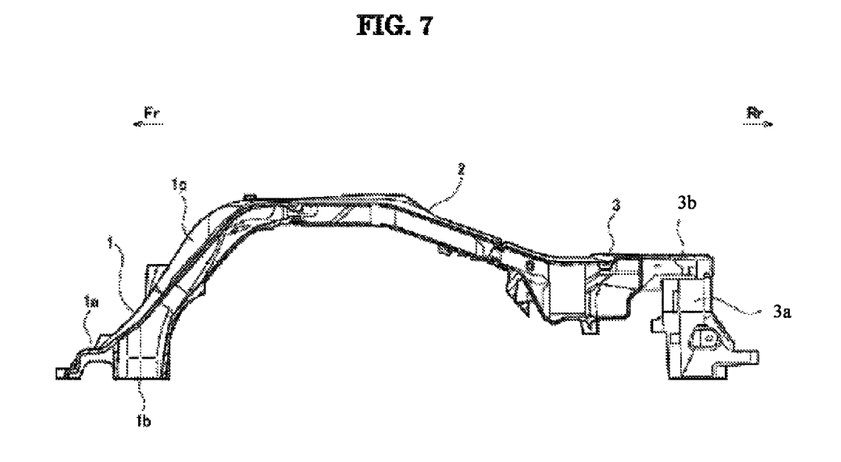
FIG. 7 is a sectional view taken along line VII-VII in FIG. 1.

As illustrated in FIG. 6 and FIG. 7, each joint part between each of the frame parts 1c of the head frame 1 and each of the tank rails 2 has a closed cross-sectional structure. More specifically, the frame part 1c and the tank rail 2 are welded and joined so that the closed cross-sectional structure of the rear end of the frame part 1c of the head frame 1 enters the inside of the closed cross-sectional structure of the front end of the tank rail 2. This makes it possible to easily secure a weld length, and to enhance a joining strength between the head frame 1 and the tank rails 2.

The body frame 3 is formed in a manner that right and left body parts 3a joined to the rear ends of the right and left tank rails 2, extended rearward and downward, and then extended downward, an upper bridge part 3b connecting between upper portions of the right and left body parts 3a, and a lower bridge part 3c connecting between lower ends of the right and left body parts 3a are integrally molded.

Figure 8:
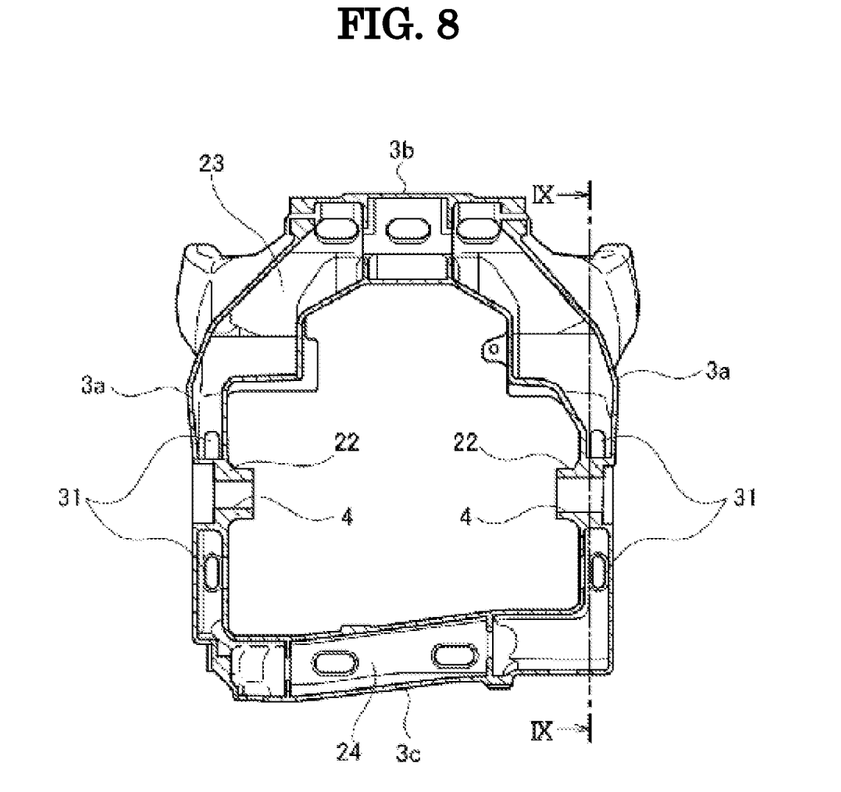
FIG. 8 is a sectional view taken along line VIII-VIII in FIG. 1.
Figure 9:
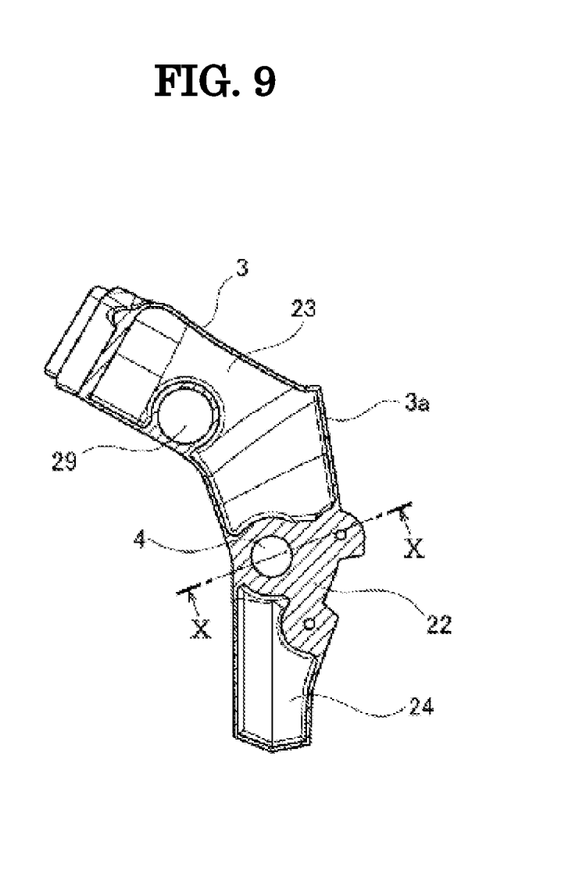
FIG. 9 is a sectional view taken along line IX-IX in FIG. 8.

Here, as illustrated in FIG. 8 and FIG. 9, the body frame 3 has solid structures 22 in the middle of the right and left body parts 3a, a continuous hollow structure 23 formed of the upper portions of the right and left body parts 3a and the upper bridge part 3b and a continuous hollow structure 24 formed of lower portions of the right and left body parts 3a and the lower bridge part 3c are provided at an upper position and a lower position, respectively, with the solid structures 22 sandwiched therebetween. Specifically, the hollow structure of the body frame 3 is vertically divided by sandwiching the solid structures 22.

Further, the pivot parts 4 are provided to the solid structures 22 of the body parts 3a, and pivotally support the not-illustrated rear swing arm. By providing the pivot parts 4 to the solid structures 22 as above, it is possible to enable the periphery of the pivot support parts for the swing arm to have a high rigidity.

Figure 10:
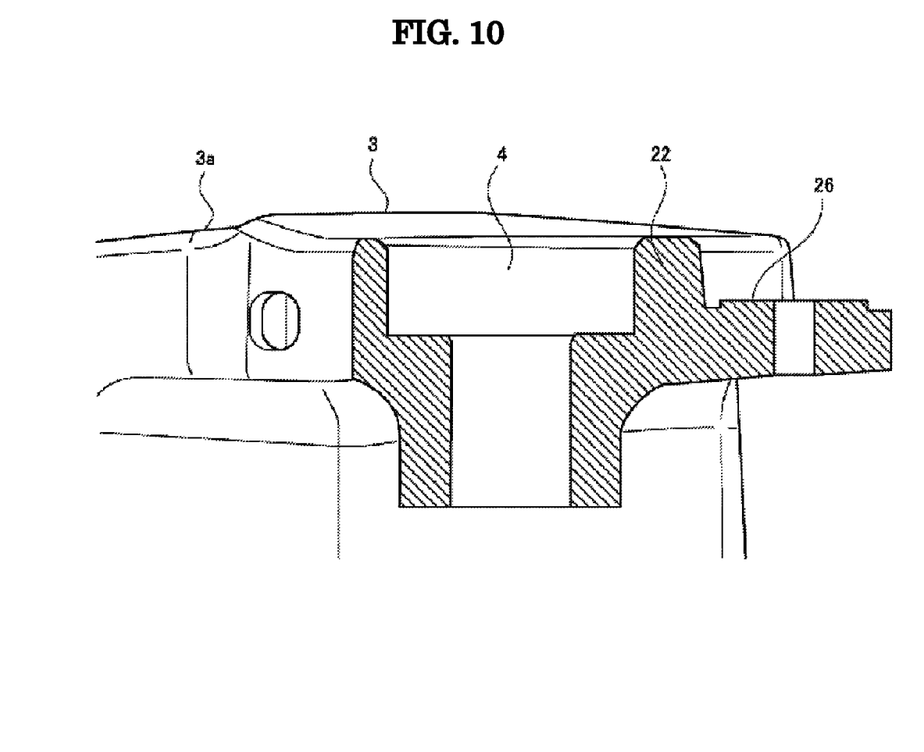
FIG. 10 is a sectional view taken along line X-X in FIG. 9.
Figure 11:
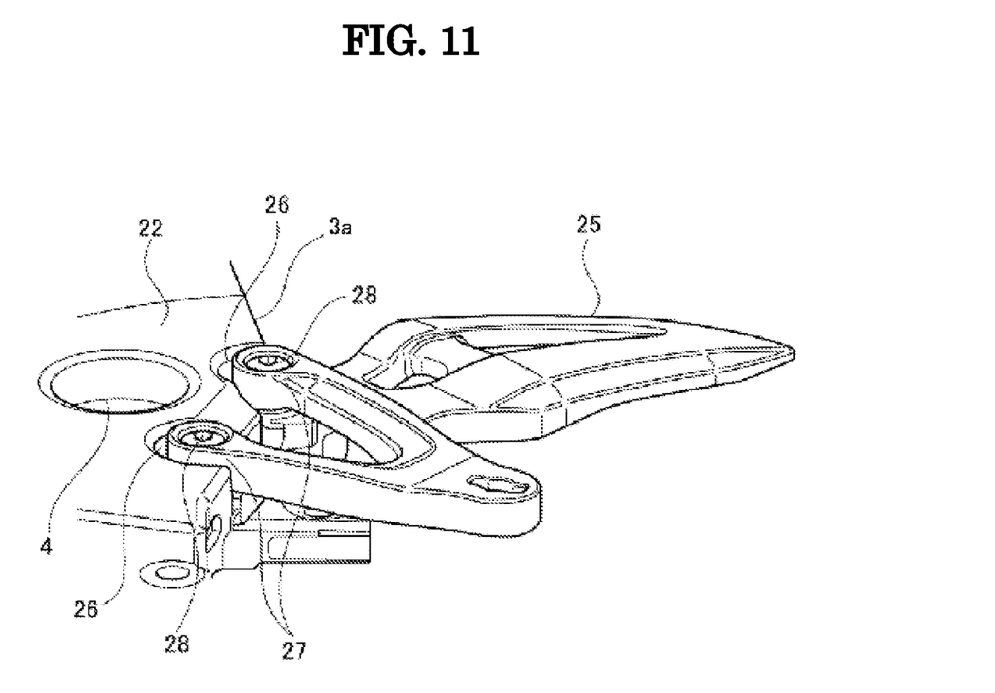
FIG. 11 is a perspective view illustrating a periphery of a footrest.

Further, as illustrated in FIG. 10 and FIG. 11, a footrest 25 is attached to the solid structure 22 of the body part 3a. At two upper and lower positions of a rear portion on a surface on the outside in the vehicle width direction of the solid structure 22 of the body part 3a, there are formed recessed portions 26 whose rear portions are opened. Further, it is configured such that attaching portions 27 of the footrest 25 are inserted into these recessed portions 26, and bolting is performed using bolts 28. As described above, by setting the surface to which the footrest 25 is attached to be lower, by one stage, than the surface on the outside in the vehicle width direction of the body part 3a, to be forced to be positioned on the inside, it is possible to reduce the thickness for that, and to realize the reduction in weight. Further, since it is possible to attach the footrest 25 so that no level difference is created by the footrest 25 with respect to the surface on the outside in the vehicle width direction of the body part 3a, a leg of an occupant is difficult to hit against the surface, resulting in that a riding comfortability and an external appearance are improved.

Further, on the body part 3a, a hole 29 for suspending the engine unit 7 is formed. Further, an engine bracket 30 is integrally molded with the lower bridge part 3c so as to project in the forward direction.

The body frame 3 designed as above is configured as an aluminum die-cast or aluminum cast product. In this case, the hollow structures are realized by using the cores, in which the separate cores, namely, the core for molding the hollow structure 23 and the core for molding the hollow structure 24, are used at the upper position and the lower position, respectively, with the solid structures 22 sandwiched therebetween. Accordingly, there is no need to align the mutual cores, resulting in that there is no chance that an internal level difference (difference in thickness) due to a positional displacement of the cores is generated. Note that at proper places of the body frame 3, holes 31 for core prints supporting the cores are formed.

As illustrated in FIG. 7, each joint part between each of the tank rails 2 and each of the body parts 3a of the body frame 3 has a closed cross-sectional structure. More specifically, the tank rail 2 and the body part 3a are welded and joined so that the closed cross-sectional structure of the front end of the body part 3a of the body frame 3 enters the inside of the closed cross-sectional structure of the rear end of the tank rail 2. This makes it possible to easily secure a weld length, and to enhance a joining strength between the tank rails 2 and the body frame 3.

In the vehicle body frame structure of the motorcycle described above, the closed cross-sectional structure continues from the coupling part 1b of the head frame 1 to the solid structures 22 (pivot parts 4) of the body frame 3 via the frame parts 1c and the tank rails 2, as illustrated in FIG. 7. Specifically, a backbone part supporting the strength from the head pipe 1a to the pivot parts 4 has the closed cross-sectional structure, which makes it possible to secure the strength and the rigidity as the vehicle body frame.

Although the present invention has been described above together with various embodiments, the present invention is not limited only to these embodiments, and modifications and the like can be made without departing from the scope of the present invention.

In the above-described embodiment, the head frame 1 and the tank rails 2 configure the front frame mentioned in the present invention, but, the configuration of the front frame is not limited.

According to the present invention, it is possible to realize a reduction in weight by making a body frame have a hollow structure, and to enable a periphery of each pivot support part for a swing arm to have a high rigidity.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A vehicle body frame structure of a motorcycle, comprising:
    a front frame extending rearward and downward from a head pipe while enlarging a width thereof; and
    a body frame joined to rear ends of the front frame and supporting a swing arm,
        the body frame being structured in a manner that right and left body parts joined to the rear ends of the front frame, an upper bridge part connecting between upper portions of the right and left body parts, and a lower bridge part connecting between lower ends of the right and left body parts are integrally molded wherein:
        solid structures each functioning as a partition wall which vertically divides an inner space are provided in the middle of the right and left body parts, a continuous upper hollow structure formed of the upper portions of the right and left body parts and the upper bridge part and a continuous lower hollow structure formed of lower portions of the right and left body parts and the lower bridge part are provided with the solid structure parts sandwiched therebetween, and the upper hollow structure and the lower hollow structure are divided by the solid structure parts; and
    pivot support parts for the swing arm are provided to the solid structure parts.

2. The vehicle body frame structure of the motorcycle according to claim 1, wherein
    a footrest is attached to the solid structure part.

* * * * *